United States Patent [19]
Brkovic

[11] Patent Number: 5,877,611
[45] Date of Patent: Mar. 2, 1999

[54] SIMPLE AND EFFICIENT SWITCHING REGULATOR FOR FAST TRANSIENT LOADS SUCH AS MICROPROCESSORS

[75] Inventor: Milivoje Slobodan Brkovic, Plano, Tex.

[73] Assignee: Lucent Technologies Inc., Murray Hill, N.J.

[21] Appl. No.: 946,963

[22] Filed: Oct. 8, 1997

Related U.S. Application Data

[60] Provisional application No. 60/028,041 Oct. 9, 1996.
[51] Int. Cl.$^6$ ....................................................... G05F 1/56
[52] U.S. Cl. ........................................... 323/222; 323/282
[58] Field of Search ................................... 323/222, 223, 323/224, 282, 284, 283, 285

[56] References Cited

U.S. PATENT DOCUMENTS

| | | | |
|---|---|---|---|
| 4,127,885 | 11/1978 | Adam et al. | 361/18 |
| 4,761,722 | 8/1988 | Pruitt | 363/17 |
| 5,055,767 | 10/1991 | Nelson | 323/285 |
| 5,084,666 | 1/1992 | Bolash | 323/283 |
| 5,422,562 | 6/1995 | Mammano et al. | 323/282 |
| 5,514,947 | 5/1996 | Berg | 323/282 |
| 5,675,240 | 10/1997 | Fujisawa et al. | 323/282 |
| 5,747,976 | 5/1998 | Wong et al. | 323/282 |
| 5,770,940 | 6/1998 | Goder | 323/282 |

*Primary Examiner*—Adolf Berhane
*Attorney, Agent, or Firm*—Scott W. McLellan

[57] ABSTRACT

A buck switching DC-to-DC regulator having a resistor and capacitor in combination across the storage inductor to measure output current and voltage. The resistor connects to the input of the inductor and the capacitor to the output of the inductor. The junction of the resistor and capacitor connects to an error amplifier for controlling the switching regulator. The regulator may be paralleled for more output current by connecting the outputs together and providing a common reference voltage to all the regulators.

20 Claims, 2 Drawing Sheets

SIMPLE AND EFFICIENT SWITCHING REGULATOR FOR FAST TRANSIENT LOADS SUCH AS MICROPROCESSORS

CROSS-REFERENCE TO RELATED APPLICATION

This application claims priority of Provisional Application Ser. No. 60/028,041 which was filed on Oct. 9, 1996.

BACKGROUND OF THE INVENTION

1. Field of the Invention

This invention relates to switching regulators in general and, more particularly, to low output voltage switching regulators, typically referred to as "buck" regulators.

2. Description of the Prior Art

To meet the demand for faster and more powerful personal computers and workstations, microprocessor manufacturers are increasing the clock frequency at which the microprocessor operates. Because most of the microprocessors are implemented in complementary metal-oxide-semiconductor (CMOS) technology, the power dissipation of the microprocessor generally increases linearly with the clock frequency. In high power designs, the heat created by the power dissipated in the microprocessor is dissipated by fan-cooled heat sinks attached to the microprocessor's package. However, even this technique may be insufficient for dissipating sufficient heat with newer microprocessors operating at even higher clock speeds. Aside from going to more exotic types of heat removal, the power dissipated must be reduced without reducing clock speeds.

Three techniques are generally used to reduce power dissipation: reducing capacitive loading of internal nodes within the microprocessor, power supply voltage reduction, and selective clock speed reduction. The first approach is typically dependent on the dimensions of junctions and conductors of the fabrication process used to make the microprocessor and are not generally under the control of a circuit designer. The last two techniques may be used in combination. Because the power dissipation is related to the square of the power supply voltage, even a small reduction in power supply voltage makes a significant reduction in power dissipation. Since power dissipation is proportional to clock frequency, if the clock is removed or significantly slowed in portions of the microprocessor not being used at any given time, very little power is dissipated in those portions and the overall power dissipated is significantly reduced.

However, these power savings come at a cost. Power supply current can swing widely—from hundreds of milliamperes to over ten amperes with the microprocessor unable to tolerate more than a few percent change in voltage. Further, the change in current can occur in tens of nanoseconds and may change in magnitude with the instructions and data being processed. The power supply designed to supply the microprocessor must have a sufficiently low impedance and tight regulation to supply such dynamic power consumption. Moreover, if the power supply voltage is only a few volts (e.g., 3.3 or even 2 volts), the power supplies that can deliver over ten amperes at these voltages are very difficult to make and control and still operate efficiently.

To further complicate matters, the microprocessor may be powered at a different voltage than the rest of the integrated circuits in the computer. For example, the voltage available to power components in the computer is typically five volts with the microprocessor operating at three volts or so. Usually, a dedicated power supply for the microprocessor is placed in close proximity to the microprocessor and preferably on the same circuit board therewith. Thus, the power supply must be small and efficient. To meet these requirements, a small DC-to-DC switching power regulator is usually used.

Switching regulators are widely used in the DC-to-DC power supply market because they are generally efficient in terms of both power conversion as well as size. The typical kind of switching regulator used to convert a higher input voltage to a lower output voltage is known as "buck" regulator. Three kinds of feedback are generally used to control the operation of the regulator: voltage alone (with current limiting), voltage with peak current control, and voltage with average current control. See "Fueling the Megaprocessors—Empowering Dynamic Energy Management" by Bob Mammano, published by the Unitrode Corporation, 1996, pages 1-5 to 1-6 and incorporated herein by reference, describing these types of feedback as part of a buck switching regulator. For microprocessor applications, the voltage with average current control type of regulation is generally preferred over the other types for the described reasons. However, regulators using a lumped resistance in series with the output thereof for current sensing (both for peak current as well as average current control techniques) usually has significant power dissipation therein (e.g., one watt or more) at the higher output currents. (The resistance must be high enough to provide a sufficiently high voltage, usually tens of millivolts, to overcome input offset errors of the sense amplifier connected to the resistor at moderate output currents.) This reduces the overall efficiency of the regulator and reduces available margin for output voltage variation, as well as requiring a physically large resistor to handle the dissipated power. Further, the circuitry implementing the average current control technique is significantly more complicated than the circuitry of the other two techniques.

SUMMARY OF THE INVENTION

Therefore, one aspect of the invention is to provide an efficient switching regulator having a voltage and current control technique.

It is another aspect of the invention to provide a switching regulator having a fast transient response with relatively simple control circuitry.

It is a further aspect of the invention to provide a switching regulator design that allows for parallel operation.

This and other aspects of the invention may be obtained generally in a computing system, a switching regulator for powering a load including a microprocessor, the switching regulator having a switch, an inductor and a filter capacitor coupled in series at junctions, and an error amplifier having an input for controlling the switch. The regulator is characterized by a first resistor, coupled to the junction between the switch and the inductor, and a capacitor connected to the first resistor at a node and to the junction between the inductor and the filter capacitor. The node is coupled to the error amplifier input.

BRIEF DESCRIPTION OF THE DRAWING

The foregoing features of this invention, as well as the invention itself, may be more fully understood from the following detailed description of the drawings, in which.

DETAILED DESCRIPTION

Figure 1:
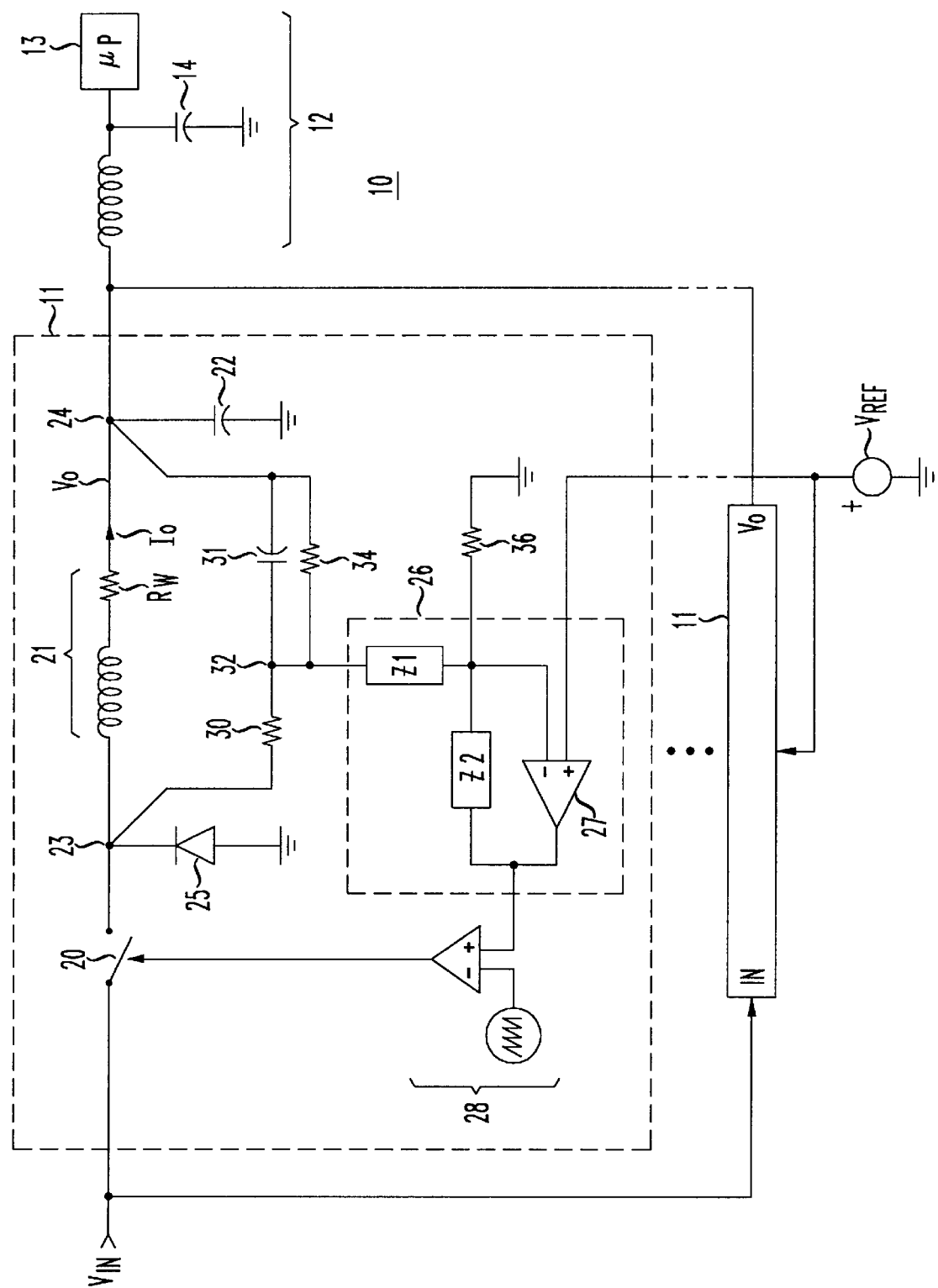
FIG. 1 is an exemplary schematic diagram of exemplary paralleled buck switching regulators, each with voltage and current control.

Generally, the invention may understood by referring to FIG. 1. As discussed below in more detail and in accordance with one embodiment of the invention, an exemplary computing system 10, has a switching regulator 11 for powering a load 12 including a microprocessor 13. The switching regulator 11 has a switch 20, an inductor 21 and a filter capacitor 22 coupled in series at respective junctions 23, 24, and an error amplifier 26 having an input for controlling the switch 20. A first resistor 30 is coupled between the junction 23 and a node 32. A capacitor 31 is coupled between node 32 and to the junction 24. Node 32 is in turn coupled to the input of the error amplifier 26. Thus, first resistor 30 and capacitor 31 combine to be the feedback path for controlling the switching regulator 11.

In more detail, the switching regulator 11, here a buck regulator, takes an input voltage from input $V_{IN}$ and converts it to a lower voltage for use by load 12. The load 12 is illustrated here as a microprocessor 13 with an exemplary one of a plurality of bypass capacitors 14 (typically of different types and capacitance values) and inductance 15 (shown here as a lumped inductance) representing the distributed inductance of the power supply printed wiring board traces. The combined effect of capacitance 14 and inductance 15 (which may be undesirable) serves to smooth out the rapid transitions in current consumption by microprocessor 13, described above.

The switching regulator 11 includes an illustrative switch 20, a series inductor 21 (which includes an inherent resistance $R_W$, discussed below), a filter capacitor 22, and a flyback diode 25. Coupled across inductor 21 is a resistor 30 in series with a capacitor 31, joining together at node 32. Node 32 in turn connects to an error amplifier 26, having in combination impedances Z1, Z2 and operational amplifier 27. Impedances Z1 and Z2 may include reactive elements to achieve lead/lag compensation to the overall operation of the regulator 11.

The output of amplifier 26 drives a conventional pulse-width modulator 28. The modulator 28 controls the opening and closing of switch 20, which is preferably a MOSFET but may be a bipolar transistor or the like. In this arrangement, the error amplifier 26 controls the duty cycle of the switch 20, while the switching frequency of the switch 20 remains substantially constant. It is understood, however, that other alternative techniques for controlling switch 20 may be used.

The combination of resistor 30 and capacitor 31 serve to provide to the error amplifier 26 signals representing the output voltage $V_O$ and output current $I_O$ from the regulator 11. The output current is substantially determined by the voltage drop across the resistance $R_W$ of inductor 21. This resistance is usually very small, typically much smaller than the intentionally introduced resistor of prior art regulators, discussed above. The output voltage is measured indirectly, here by voltage on node 23.

Briefly, the voltage on node 23 is approximately $V_O + I_O R_W$. By the closed loop nature of the regulator 11, the output voltage $V_O$ is maintained to be substantially equal to $V_{REF} - I_O R_W$. Thus, the output impedance is approximately the resistance $R_W$. Accordingly, the output voltage droops with increasing current $I_O$. Since resistance $R_W$ is small, the amount of droop is correspondingly small and can be compensated for as discussed below.

Figure 2:
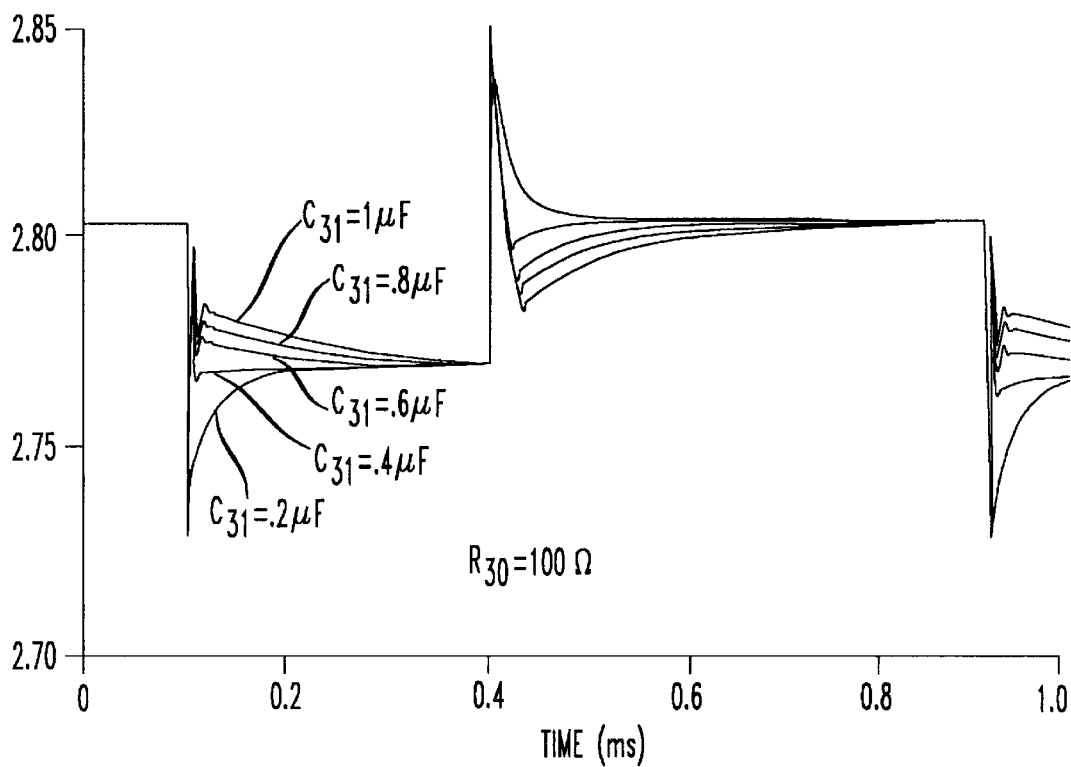
FIGS. 2 and 3 illustrate the simulated effect of using different exemplary component values for resistor 30 and capacitor 31 on the transition response of a switching regulator shown in FIG. 1.
Figure 3:
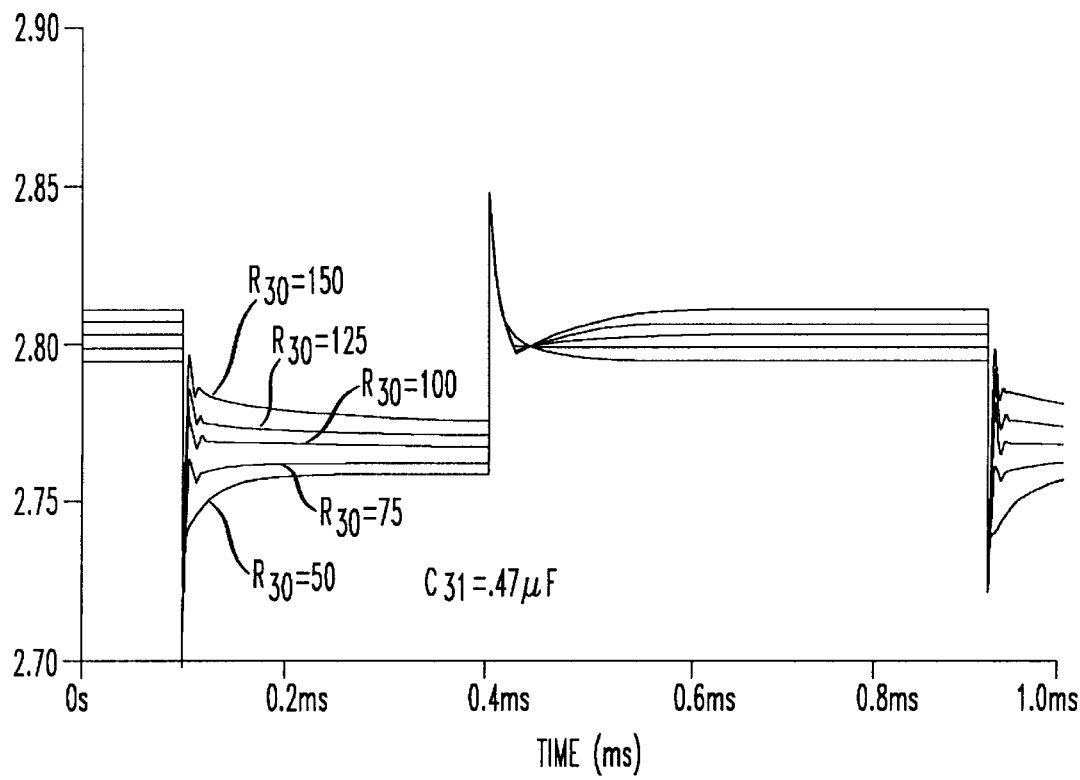

The choice of resistor 30 and capacitor 31 affects the response of the switching regulator to transients in output current. FIGS. 2 and 3 illustrate the effect of different values for resistor 30 and capacitor 31 on the output voltage $V_O$ in response to changes in output current. FIG. 2 shows the effect using a fixed value for resistor 30 ($R_{30}$=100 Ω) and varying the capacitance of capacitor 31, while FIG. 3 shows using a fixed value for capacitor 31 ($C_{31}$=0.47 μF) and varying the resistance of resistor 30. In both cases, the trace having the flattest response may be the most desirable.

As noted above, the output voltage $V_O$ decreases with increasing output current $I_O$ due to any voltage drop across resistance $R_W$. While the resistance of $R_W$ is small, at high output currents several tens of millivolts may be dropped across it. To compensate for any voltage drop across the resistance $R_W$ a resistor 34 is added across capacitor 31. In this case, the output voltage $V_O$ is approximately $$V_{REF} - \frac{R_{34}}{[R_{30} + R_{34}]} I_O R_W$$

where $R_{30}$ and $R_{34}$ is the resistance of resistors 30 and 34, respectively.

A further adaptation is the addition of resistor 36 to the error amplifier 26. As can be readily understood by those with ordinary skill in the art, resistor 36 combined with impedance Z1 allows the output voltage $V_O$ to be scaled to the reference voltage $V_{REF}$ and can be set accordingly.

The illustrated embodiment of FIG. 1 shows multiple regulators 11 operating parallel and sharing a common reference voltage $V_{REF}$ to provide more current to the load 12 than one regulator 11 can provide individually. Because of the output current control by the regulators 11, over current by any one of the regulators is avoided. Moreover, voltage and output current control by the regulators 11 compensate for differences in performance by the various pulse-width modulators 28 in the paralleled regulators 11.

While the embodiment disclosed herein is a buck switching regulator, other types of switching regulator circuits may take advantage of this invention.

Having described the preferred embodiment of this invention, it will now be apparent to one of skill in the art that other embodiments incorporating its concept may be used. Therefore, this invention should not be limited to the disclosed embodiment, but rather should be limited only by the spirit and scope of the appended claims.

I claim:

1. In a computing system, a switching regulator for powering a load including a microprocessor, the switching regulator having a switch, an inductor and a filter capacitor coupled in series at junctions, and an error amplifier having an input for controlling the switch, CHARACTERIZED BY:
   a first resistor coupled to the junction between the switch and the inductor;
   a capacitor connected to the first resistor at a node and to the junction between the inductor and the filter capacitor;
   wherein the node is coupled to the error amplifier input.

2. The computing system as recited in claim 1, further characterized by a second resistor disposed in parallel with the capacitor.

3. The computing system as recited in claim 1, further characterized by the error amplifier having an output coupled to the switch, an inverting input coupled to the node and a non-inverting input being coupled to a reference voltage.

4. The computing system as recited in claim 3, further characterized by:
   a first impedance coupled between the node and the inverting input of the error amplifier; and
   a second impedance disposed between the output and inverting input of the error amplifier.

5. The computing system as recited in claim 4, further characterized by a third resistor connected to the error amplifier inverting input, wherein the third resistor and first impedance substantially determines the output voltage of the regulator in proportion to the reference voltage.

6. The computing system as recited in claim 3, further comprising a plurality of power supplies having a common reference voltage and a common output coupled to the load.

7. The computing system as recited in claim 3, wherein the switching regulator is a buck switching regulator.

8. The computing system as recited in claim 7, further comprising a diode coupled to the junction of the switch and the inductor.

9. The computing system as recited in claim 3, wherein the error amplifier includes a pulse-width modulator for controlling the switch's opening and closing duration and frequency.

10. The computing system as recited in claim 9, wherein the switch further includes a MOSFET.

11. A switching regulator having a switch, an inductor and a filter capacitor coupled in series at junctions, and an error amplifier having an input for controlling the switch, CHARACTERIZED BY:
   a first resistor coupled to the junction between the switch and the inductor;
   a capacitor connected to the first resistor at a node and to the junction between the inductor and the filter capacitor;
   wherein the node is coupled to the error amplifier input.

12. The computing system as recited in claim 11, further characterized by a second resistor disposed in parallel with the capacitor.

13. The computing system as recited in claim 11, further characterized by the error amplifier having an output coupled to the switch, an inverting input coupled to the node and a non-inverting input being coupled to a reference voltage.

14. The computing system as recited in claim 13, further characterized by:
   a first impedance coupled between the node and the inverting input of the error amplifier; and
   a second impedance disposed between the output and inverting input of the error amplifier.

15. The computing system as recited in claim 14, further characterized by a third resistor connected to the error amplifier inverting input, wherein the third resistor and first impedance substantially determines the output voltage of the regulator in proportion to the reference voltage.

16. The computing system as recited in claim 13, further comprising a plurality of power supplies having a common reference voltage and a common output coupled to the load.

17. The computing system as recited in claim 13, wherein the switching regulator is a buck switching regulator.

18. The computing system as recited in claim 17, further comprising a diode coupled to the junction of the switch and the inductor.

19. The computing system as recited in claim 13, wherein the error amplifier includes a pulse-width modulator for controlling the switch's opening and closing duration and frequency.

20. The computing system as recited in claim 19, wherein the switch further includes a MOSFET.

* * * * *